United States Patent
Matsuda

[11] Patent Number: 5,820,709
[45] Date of Patent: Oct. 13, 1998

[54] VEHICLE TIRE AND RIM COMBINATION

[75] Inventor: Toshikazu Matsuda, Osaka, Japan

[73] Assignee: National Tire Co., Ltd., Kadoma, Japan

[21] Appl. No.: 792,705

[22] Filed: Jan. 29, 1997

Related U.S. Application Data

[63] Continuation of Ser. No. 401,494, Mar. 10, 1995, abandoned.

[30] Foreign Application Priority Data

Mar. 11, 1994 [JP] Japan ..................................... 6-041265

[51] Int. Cl.[6] ........................................................ B60C 5/00
[52] U.S. Cl. .......................... 152/501; 152/511; 152/513; 152/383
[58] Field of Search .................................... 152/513, 501, 152/511, 382, 383

[56] References Cited

U.S. PATENT DOCUMENTS

| | | | |
|---|---|---|---|
| 612,981 | 10/1898 | Welch | 152/383 |
| 1,642,897 | 9/1927 | Sarver | 152/513 |
| 4,289,186 | 9/1981 | Wilde | 152/513 |

FOREIGN PATENT DOCUMENTS

| | | | |
|---|---|---|---|
| 738397 | 1/1932 | France | 152/501 |
| 1150207 | 1/1958 | France | 152/513 |
| 63-9003 | 1/1988 | Japan . | |
| 5502414 | 4/1993 | Japan . | |
| 921576 | 2/1992 | WIPO . | |

OTHER PUBLICATIONS

"Bike Nashbar" catalog, Late Spring 1993, pp. 28 and 30.
Figures only of FR 620,693, Jan. 1927.

*Primary Examiner*—Geoffrey L. Knable
*Attorney, Agent, or Firm*—Cushman Darby & Cushman IP Group of Pillsbury Madison & Sutro LLP

[57] ABSTRACT

A vehicle tire wheel has a tire (31) and a rim (32) with elastic members (39) formed on left and right side flange pares (37). The tire (31) is mounted to the rim (32) so that the elastic members (39) cone in contact with left and right side bead parts (35) of the tire (31). The elastic members reduce undesirable force exerted on the left and right side bead parts (35) from the rim (32).

6 Claims, 12 Drawing Sheets

VEHICLE TIRE AND RIM COMBINATION

This is a continuation of application Ser. No. 08/401,494, filed on Mar. 10, 1995, which was abandoned upon the filing hereof.

BACKGROUND OF THE INVENTION

1. Field of the Invention

The present invention relates to configuration of vehicle tire wheel comprising a tire and a rim for holding the tire.

2. Description of the Related Art

Pneumatic or air-filled tire wheels are used widely for vehicles such as bicycles, auto-bicycles, automobiles, etc.

However, the air filled tire wheel has a shortcoming of possible puncture or flat tire when the tire is subjected to a mechanical damage resulting in a hole or holes or cracks in the tire so as to lose the air therein. Therefore, a measure for protecting the tire from the puncture or the flat tire has been a big problem to be solved for a long time. The punctures or the flat tires are made by various causes, and among them penetration by a nail and strong beating or knocking of tire between a hard stone or the like matter on the road and the rim are common.

The puncture caused by strong beating of tire between a hard matter on the road and the rim, hereafter referred to the "pinch puncture", which are often observed in the conventional bicycle tire wheels, are explained below taking an example of the conventional bicycle tire wheel configuration.

Figure 12:
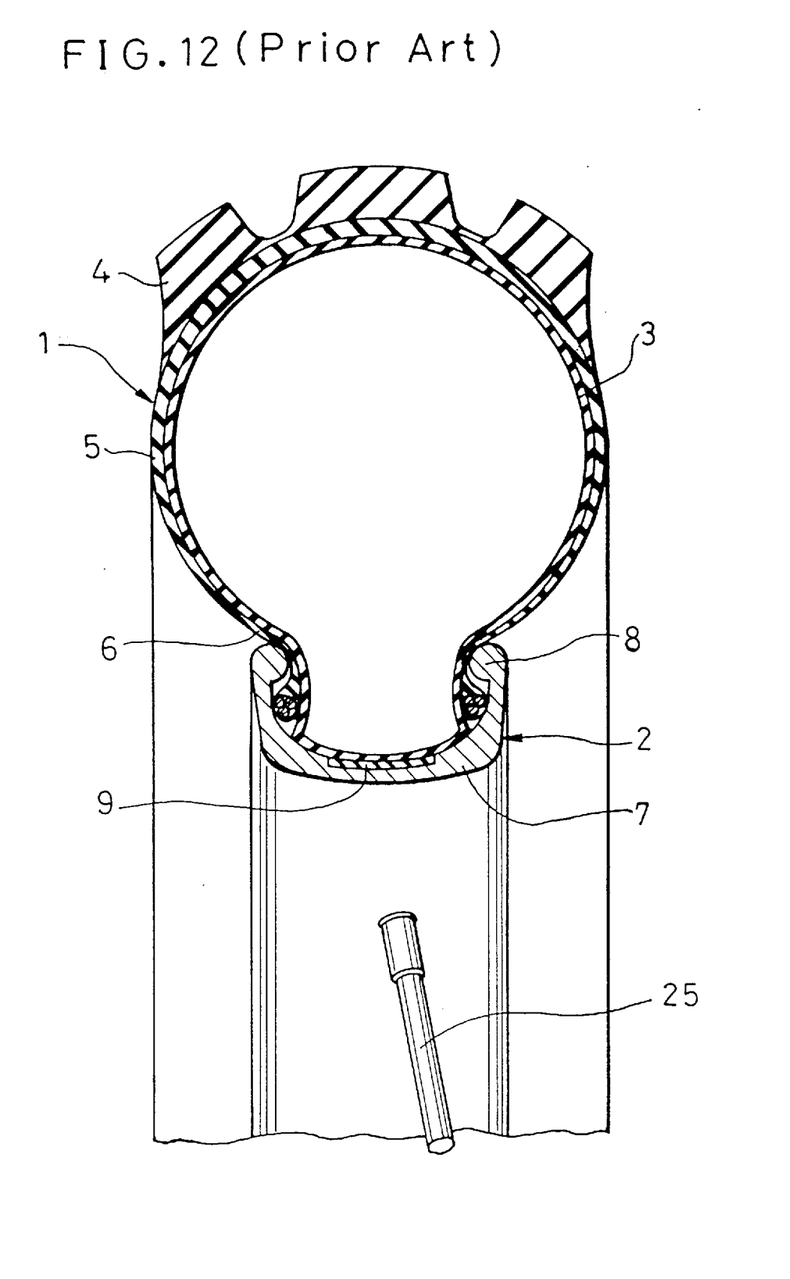
FIG. 12 is a sectional view of a typical bicycle tire wheel configuration.

FIG. 12 is a sectional view of a typical bicycle tire wheel configuration. As shown in FIG. 12, the typical bicycle tire wheel configuration comprises a rim 2, a tire 1 mounted on the rim 2 and a inner tube 3 contained inside the closed space formed by the tire 1 and the rim 2. The tire 1 is made of rubber and as shown in the sectional view of FIG. 12 comprises tread 4, left and right side walls 5 extending from respective side ends of the tread 4 and left and right beads 6 formed at the ends of respective side walls 5.

The rim 2 is a ring shaped member to be connected by a plurality of spokes 25 to a hub (not shown). The rim 2 comprises, as shown in the sectional view of FIG. 12, rim base part 7 and left and right flange parts 8 formed extending from respective side ends of the rim base part 7. The afore-mentioned left and right beads 6 are fixed to the left and right flange parts 8, respectively, by inserting the former in the concave spaces formed in the latter. When air is filled inside the inner tube 3, by expansion of a section of the inner tube 3, the beads 6 are strongly pressed to the inside wall of the flange parts 8 at the concave spaces. As a result, the tire 1 is strongly and stably fixed on the radially outer face of rim 2 over-hanging outward of the flange parts 8.

When the vehicle runs over or collides with the hard obstruction such as stone, the tire 1 and the inner tube 3 are greatly deformed by the beating and pinching the tire 1 between the stone and-the rim 2, thereby making holes, for example, snake bite-like holes in the inner tube 3, or in some cases further damaging the beads 6 or/and the tread 4.

The pinch puncture takes place when the air pressure in the inner tube 3 is not sufficient, and may take place often in all-terrain bicycles or mountain bicycles which are generally used for sport to run on hard roads in a hard manner of riding. When the pinch puncture happens during a high speed running to cause a sudden loss of the air filled in the inner tube 3, the tire 1 mostly comes out of the rim 2, leading to dangerous overturn accident.

In order to prevent the pinch puncture, a proposal has been disclosed in the Japanese published unexamined utility model application (laid open utility model publication) No. Sho 63-9003. The device disclosed in this prior art reference is described hereafter.

Figure 14:
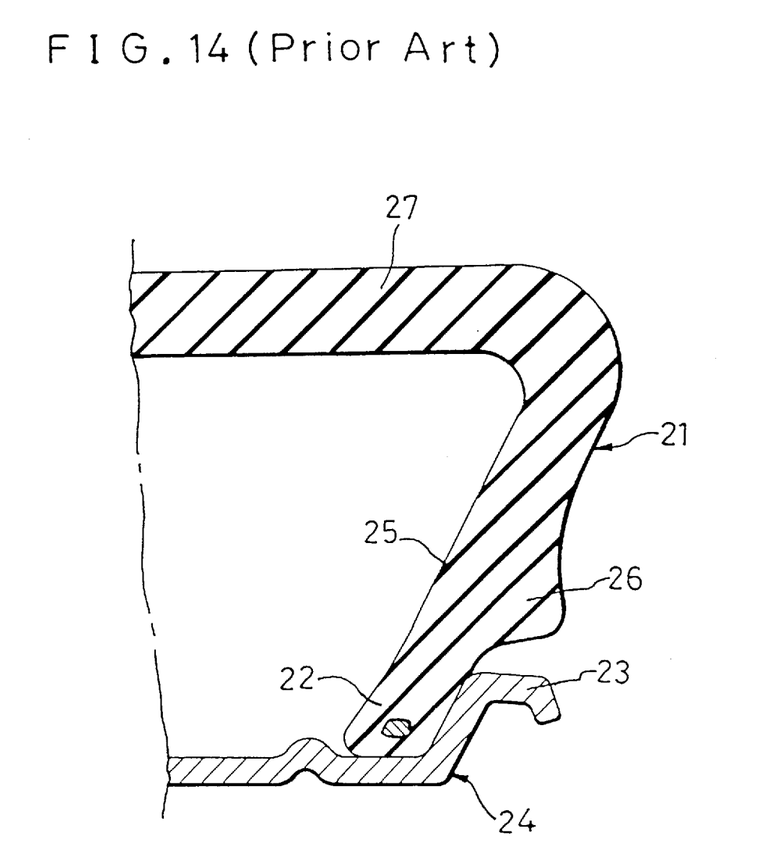
FIG. 14 is a sectional view showing a vehicle tire wheel disclosed in the Japanese published unexamined utility model application No. Sho 63-9003.

As shown in FIG. 14, in this proposed device, the beads 22 of the tire 21 are fixed by inserting them between the flanges 23 of the rim 24. Each side wall 25 of the tire 21 is provided with a protruding thick part 26 at the part between the bead 22 and the tread 27. The thick part serves to cushion the tread 27 to protect it from the pinch puncture.

However, the prior art of FIG. 14 has a problem that the side walls 25 have protruding thick part 26 thereby increasing the weight of tire wheel, and besides such protruding thick part 26 inevitably causes loss of flexibility, hence shock absorbing characteristic of the tire wheel. Recently, decrease of weight is a great demand from the view point of fuel saving and drivability of vehicle, and furthermore, in bicycles, especially in mountain bicycles, even small decrease of weight is very much influential for the overall characteristic, since the weight of the whole bicycle is light.

Furthermore, the provision of the above mentioned thick part 26 in the prior art is troublesome in a work for inserting the beads 22 in the rim 24, and also in a work for finding proper positioning between the protruding thick part 26 and the flange part 23. Still furthermore, the protruding thick part 26 has another problem that the thickness of the protruding thick part 26 and its position should be designed differently corresponding to various shapes of the rims to be inserted.

OBJECT AND SUMMARY OF THE INVENTION

The purpose of the present invention is to provide vehicle tire wheel wherein a pinch puncture is prevented without the increase of weight and without the loss of flexibility of the tire and loss of workability of inserting the tire in the rim.

The above-mentioned purposes of the invention are solved by the configuration of the vehicle tire wheel which comprises a tire having a tread part for contacting a road when running or standing still, a pair of side walls connecting with both side ends of the tread part and a pair of beads connected to the pair of side walls, a rim for mounting the tire thereon by inserting a portion of the tire therein, the rim having a rim base part, a pair of flange parts connected with side ends of the rim base part so as to embrace the beads therebetween, and an elastic member formed on metal parts of the pair of flange parts to come in contact with the tire.

Another object of the invention is solved by the configuration of the vehicle tire wheel which comprises an air filled closed pneumatic tire with a circular or an elliptic section, and a rim for mounting the tire thereon at a concave tire holding face, the rim having elastic members at respective side ends of the rim.

According to the present invention, at least one part of the flange part to contact the beads are made of elastic material, such as rubber or synthetic rubber. Therefore, even when the vehicle runs over an obstructions such as hard stone, the hitherto observed pinch puncture caused by strong pinching of tire and the inner tube between the obstruction and the hard rim is substantially eliminated. Furthermore, according to the configuration of replacing the pertinent part of the metal or the like hard flange with the elastic material, the weight of the rim of the vehicle tire wheel is decreased in comparison with the conventional metal rim tire wheel.

DESCRIPTION OF THE PREFERRED EMBODIMENTS

Hereafter, preferred embodiments of the present invention are described with reference to the accompanying drawings.

[Embodiment 1]

Figure 1:
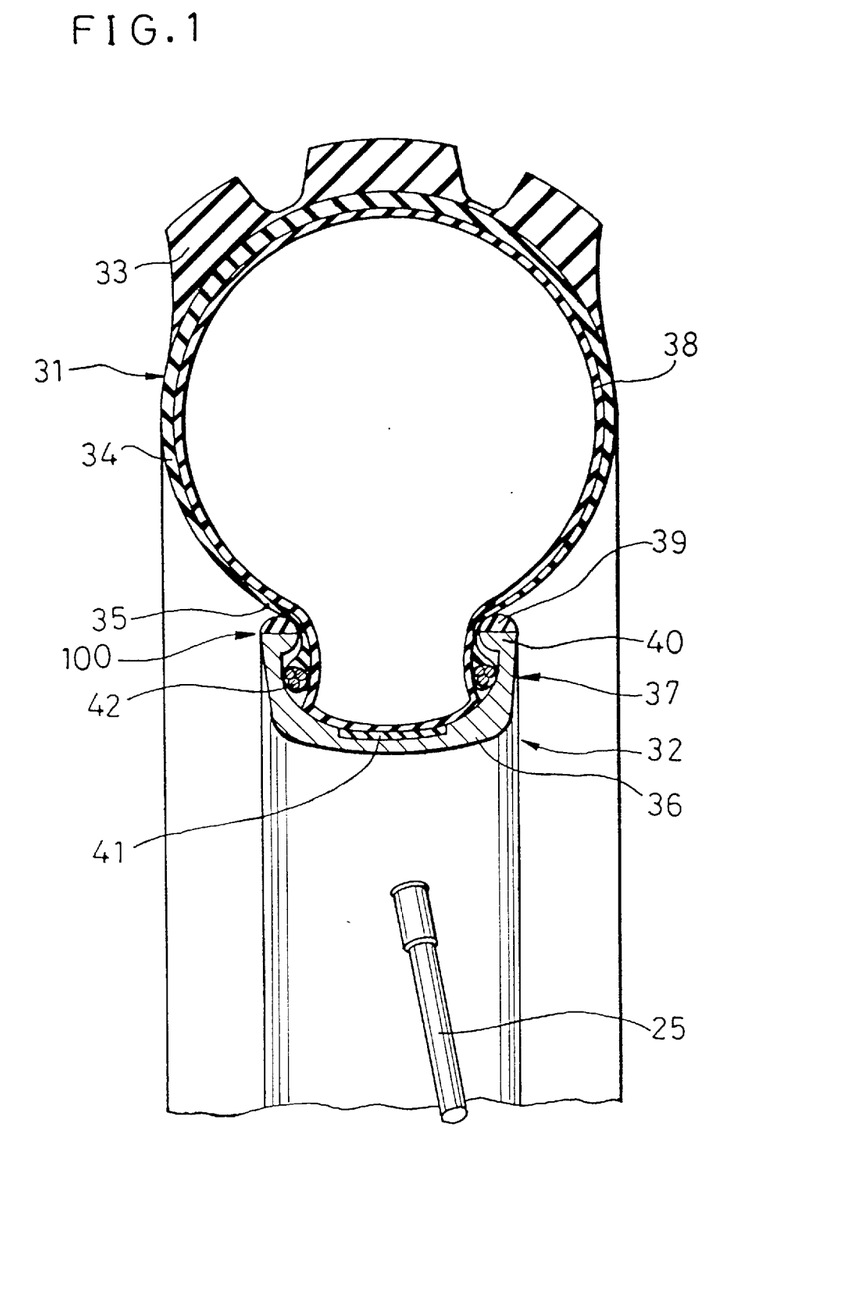
FIG. 1 is a sectional view showing a vehicle tire wheel of a first embodiment of the present invention.

FIG. 1 is a sectional view showing a vehicle tire wheel of a first embodiment of the present invention.

In FIG. 1, a tire wheel for use in vehicles such as a bicycle and an automobile are shown. The vehicle tire wheel comprises a tire 31 and a rim 32.

In this embodiment, the vehicle tire wheel contains an inner tube 38 to be filled with air. The vehicle tire wheel supports by air of predetermined pressure in the inner tube 38 the weights of the vehicle and load conveyed from the rim 32 through the tire 31 to the ground. That is, as shown in FIG. 1, when the inner tube 38 is filled with air of the predetermined pressure, the outer surface of the inner tube 38 comes in contact with the inside of the tire 31 and the rim 32. Thereby, the tire 31 and the inner tube 38 keeps a ring-shaped configuration on the rim 32, and supports the weights of the vehicle and load.

The tire 31 is made by a vulcanized rubber and a carcass such as a synthetic fiber, and supports the weights. The tire 31 comprises a tread part 33 having a tread pattern which contacts the road, left and right sidewall parts 34 extending from both sides of the tread part 33, and bead parts 35 extending from ends of the respective sidewall parts 34. The sidewall parts 34 form left and right side faces of the tire assembly. Each bead part 35 includes plural, for example three, ring-shaped bead wires 42 of steel or like strong elastic material at its end part. These bead wires 42 give respective bead parts 35 ring-shapes.

The rim 32 is a ring-shaped member, and supports the tire 31. The rim 32 is generally made of a metal such as an aluminum alloy except for the below-mentioned elastic member 39. The rim 32 is connected with an hub (not shown) via plural spokes 25 so that the vehicle tire wheel is rotated by driving the hub around the axle. The rim 32 comprises a base or a bottom part 36 and a pair of flange parts 37, which are disposed symmetrically with respect to the bottom part 36 extending from both ends of the bottom part 36 in the radially outward direction of the axle of the wheel.

A rim-flap 41, which is made of the vulcanized rubber, is fixed on the inside face of the bottom part 36, so that the rim-flap 41 covers the end points (not shown) of the plural spokes 25 to prevent the points from damaging the inner tube 38 when the inner tube 38 is inflated with air.

The flange parts 37 have protrusion regions 100 consisting of an elastic member 39 and a metal part 40 at the end parts of the flange parts 37, respectively. The respective protrusion regions 100 are bulged or protrude toward the inside space defined between a pair of the opposing flange parts 37.

Thereby, when the air pressure in the inner tube 38 is held at the predetermined value after inserting the bead parts 35 between the flange parts 37, the bead parts 35 are held pressed against the respective flange parts 37 by air pressure in the inner tube 38, so that the bead parts 35 come in contact with the respective elastic members 39. As a result, the tire 31 is stably mounted to the rim 32 in the radially outward direction of the axle.

Figure 2:
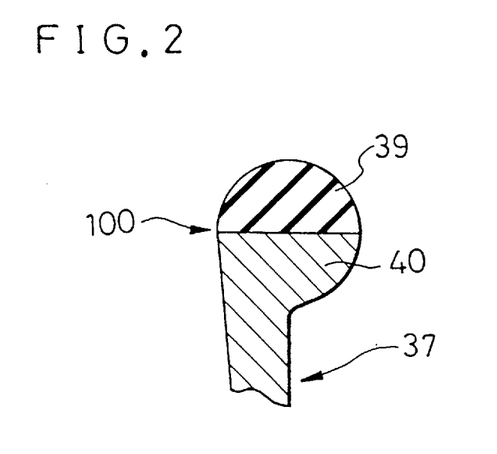
FIG. 2 is a sectional view of a head part showing the flange part 37 of the first embodiment of the present invention.

A concrete construction of the protrusion region 100 will be elucidated with reference to FIG. 2, which is a sectional view of head part showing one of the flange parts 37 of the first embodiment of the present invention.

In FIG. 2, the elastic member 39 is made of rubber such as the vulcanized rubber or a synthetic rubber, and is fixed on the metal part 40 by an adhesive. This elastic member 39 is a ring-shaped body, and a sectional shape of the elastic member 39 is, as shown in FIG. 2, a semicircular shape. Thus, in the protrusion region 100, the elastic member 39 is provided replacing the head part of the flange part 37. Therefore, it is possible to decrease weight of the vehicle tire wheel in comparison with that of the prior art.

As has been elucidated, the bead parts 35 come in contact with the respective elastic members 39 when the inner tube 38 is filled with air of predetermined pressure. Thereby, it is possible to reduce abrasion and deterioration of the bead parts 35 by rubbing with the protrusion regions 100.

Figure 3:
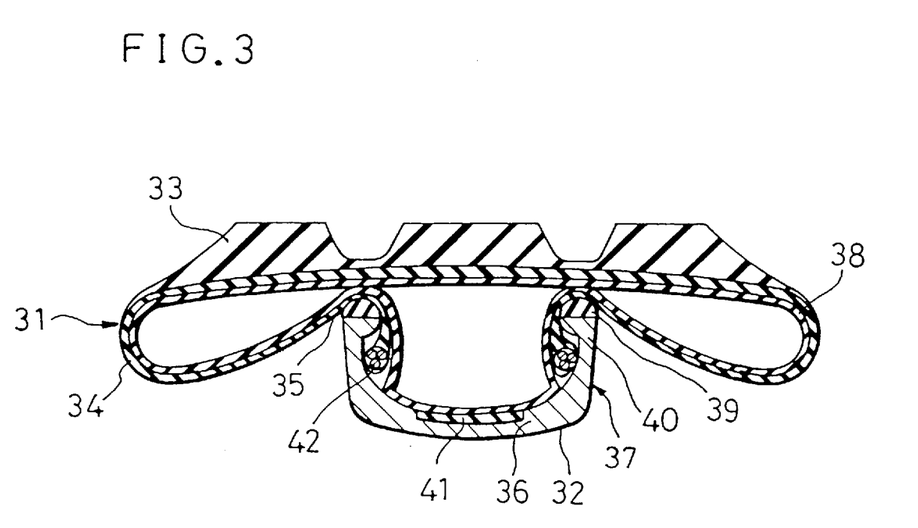
FIG. 3 is a sectional view showing a state of deformation of the tire 31 when the vehicle tire wheel runs onto an obstruction such as a stone.

The further function of the elastic member 39 will be elucidated with reference to FIG. 3, which is a sectional view showing a state of deformation of the tire 31 when the vehicle tire wheel runs onto an obstruction, such as a stone.

Figure 13:
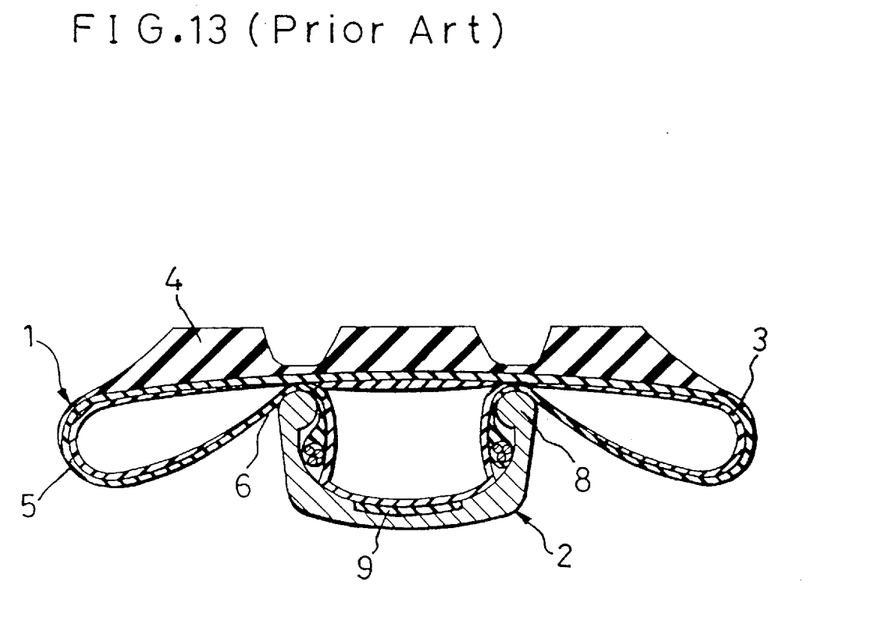
FIG. 13 is a sectional view showing a state of deformation of the tire 1 when the vehicle tire wheel runs into an obstruction such as a stone.

As shown in FIG. 3, the tread part 33, the bead parts 35 and the inner tube 38 are shown caught between the elastic member 39 and an obstruction such as a stone (not shown). This state is the same as that shown by FIG. 13 of the prior art. That is, as has been explained in the case of the prior art, such state would be liable to cause the pinch puncture of the inner tube 3 and the tire 1, because the inner tube 3, the tread part 4 and the bead parts 6 of the soft rubber are strongly pressed between the hard obstruction and the flange parts 8.

However, in the first embodiment, since the elastic member 39 serves as a pressing force absorber or shock absorber, the bead parts 35 and the inner tube 38 are protected by the elastic member 39 from irreversible damage. Thereby, it is possible to reduce the possibility of the occurrence of the pinch puncture. Furthermore, even if a puncture occurs in the tire 31 and the inner tube 38, the elastic member 39 absorbs the force on the tire 31 and the inner tube 38 from the flange part 37 until the puncture is repaired. Therefore, it is possible to reduce damage of the tire 31 and the inner tube 38 in comparison with the prior art.

Apart from the aforementioned explanation, wherein the elastic member 39 is provided with the rim 32 called "HE type" in JIS (Japanese Industrial Standard), an alternative construction may be such that the elastic member 39 is provided with the rim called "BE type", "WO type" or "tubular type" in JIS (Japanese Industrial Standard).

Furthermore, the construction of the protrusion region 100 can be modified in accordance with the use of the tire assembly. For example, as described in the below-mentioned modified versions I, II and III, it is possible to change a volume ratio in the protrusion region 100 or a configuration of connection between the elastic member 39 and the metal part 40. Moreover, it is possible that the whole flange part 37 is made of a hard elastic material such as a hard vulcanized rubber. Furthermore, apart from the aforementioned embodiment, wherein the elastic member 39 is fixed on the end face of the flange part 37, a modified embodiment may be formed such that the elastic material is formed by thick coating roundly in the sectional view on the end part of the flange part so that the thick layer of elastic material is disposed between the bead part 6 and the flange part 8.

Furthermore, apart from the aforementioned explanation, wherein the elastic member 39 is made of a solid elastic material such as the vulcanized rubber, an alternative construction may be such that the elastic member 39 is formed by painting a highly viscous liquid on the metal part 40 of metal by several times repetition to form the elastic member.

<A MODIFIED VERSION I OF THE FIRST EMBODIMENT>

Figure 4:
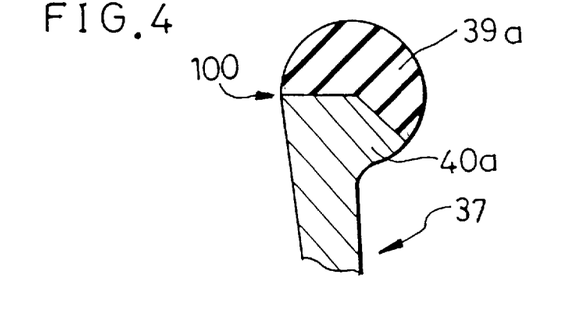
FIG. 4 is a sectional view of the head part of the flange part 37, showing a modified version I of the first embodiment of the present invention.
Figure 5A:
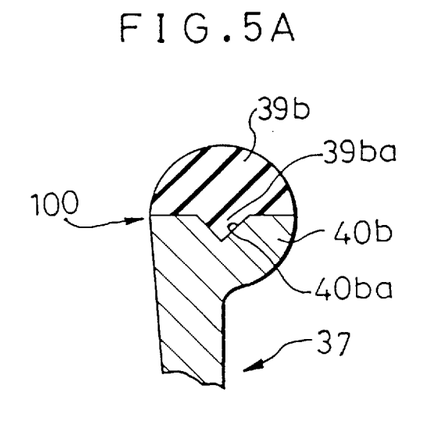
FIG. 5A is a sectional view of head part of the flange part 37, showing a modified version II of the first embodiment of the present invention.
Figure 5B:
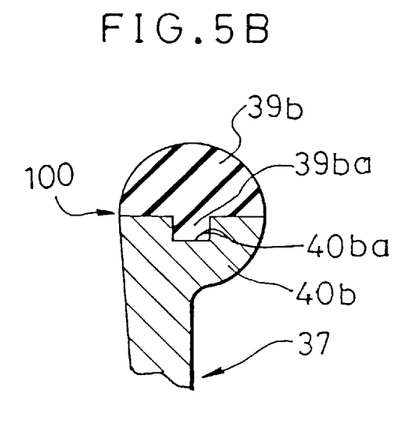
FIG. 5B is a sectional view of head part of the flange part 37, showing a modified version II of the first embodiment of the present invention.
Figure 5C:
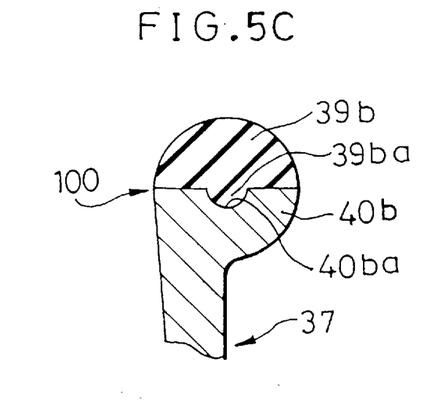
FIG. 5C is a sectional view of the head part of the flange part 37, showing a modified version II of the first embodiment of the present invention.
Figure 5D:
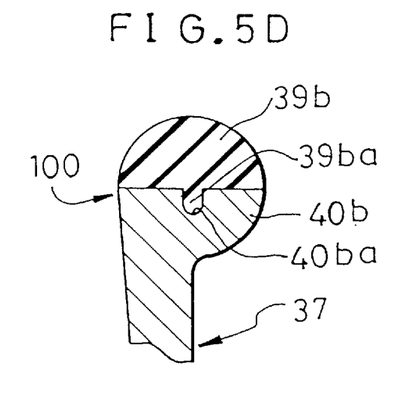
FIG. 5D is a sectional view of the head part of the flange part 37, showing a modified version II of the first embodiment of the present invention.

A modified version I of the first embodiment will be elucidated with reference to FIG. 4. FIG. 4 is a partial sectional view of the flange part 37, showing a modified version I of the first embodiment of the present invention. In this modified version I of FIG. 4 the volume ratio of the elastic member 39a and the metal part 40a of the flange part 37 in the protrusion region 100 is modified from the first embodiment. In this modified version I, the same components and parts as those of the first embodiment are designated by the same numerals, and corresponding descriptions similarly apply. Therefore, the descriptions will be made mainly on the modified parts from the first embodiment.

The volume of the elastic member 39a is formed larger than the metal part 40a, that is, the elastic member 39a is enlarged in a direction facing to the bead part 35. As shown in FIG. 4, the sectional shape of the elastic member 39a is of a fan shape having an obtuse angle.

Thereby, when the bead part 35 is deformed toward the protrusion region 100, the region of the bead part 35 that is protected by the elastic member 39a becomes larger than that of the first embodiment. Accordingly, it is possible to further reduce the abrasion and the deterioration of the bead part 35 caused by rubbing against the protrusion region 100 in comparison with the first embodiment.

<A MODIFIED VERSION II OF THE FIRST EMBODIMENT>

A modified version II of the first embodiment will be elucidated with reference to FIGS. 5A, 5B, 5C or 5D. FIGS. 5A through 5D each is a sectional view of head part the flange part 37, showing a modified version II, of the first embodiment of the present invention. In this modified version II, the same components and parts as those of the first embodiment are designated by the same numerals, and corresponding descriptions similarly apply. Therefore, the descriptions will be made mainly on the modified parts from the first embodiment.

In this modified version II of FIG. 5A to FIG. 5D, the configuration of connection between an elastic member 39b and a metal part 40b is modified from the first embodiment. That is, a groove 40ba is formed on the metal part 40b in a circumferential direction of the rim, and an interfit part 39ba is formed on the elastic member 39b so as to fit into the groove 40ba. Thereby, in the fabrication of the protrusion region 100, the elastic member 39b is easily mounted on the metal part 40b.

When the bead part 35 is deformed in the direction parallel to the axle direction, the elastic member 39b receives the force from the bead part 35 in FIGS. 5A through 5D from right to left. Then, since the interfit part 39ba is engaging with the groove 40ba, the elastic member 39b is deformed in the axle direction without disengaging from the metal part 40b. Thus, in this modified version II, it is possible to improve the durability against the force in the axle direction in comparison with the first embodiment.

<A MODIFIED VERSION III OF THE FIRST EMBODIMENT>

Figure 6A:
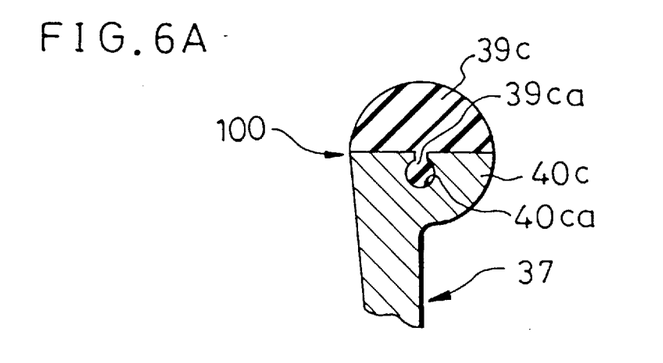
FIG. 6A is a sectional view of the head part of the flange part 37, showing a modified version III of the first embodiment of the present invention.
Figure 6B:
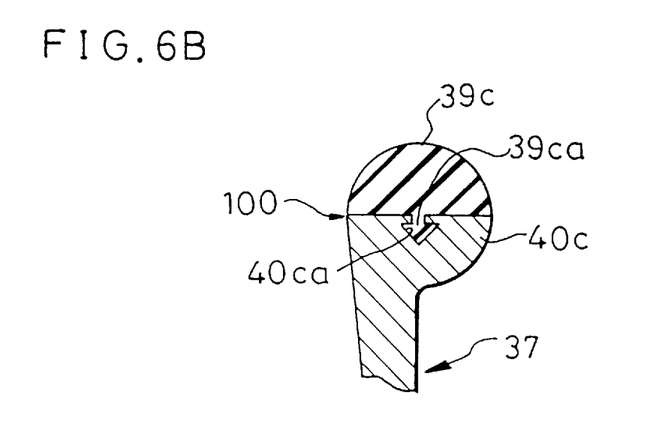
FIG. 6B is a sectional view of the head part of the flange part 37, showing a modified version III of the first embodiment of the present invention.
Figure 6C:
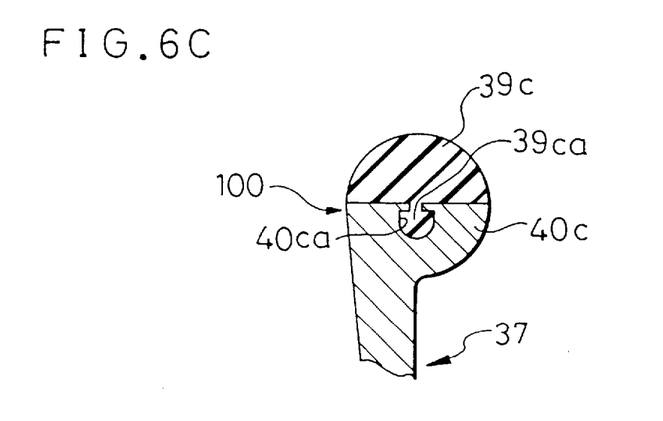
FIG. 6C is a sectional view of head part of the flange part 37, showing a modified version III of the first embodiment of the present invention.

A modified version m of the first embodiment will be elucidated with reference to FIGS. 6A, 6B or 6C. Each of FIGS. 6A through 6C is a sectional view of head part of the flange part 37. Each of FIGS. 6A to 6C shows a modified version III of the first embodiment of the present invention. In this modified version III, the same components and parts as those of the first embodiment are designated by the same numerals, and corresponding descriptions similarly apply. Therefore, the descriptions will be made mainly on the modified parts from the first embodiment.

In this modified version III, the configuration connecting between an elastic member 39c and a metal part 40c is modified from the first embodiment. That is, a groove 40ca having a narrower opening part than inside of groove 40ca is formed on the metal part 40c in a circumferential direction of the axle, and an interfit part 39ca of the elastic member 39c is made in such a shape as to engage with the groove 40ca. That is, the interfit part 39ca has an engaging member having a wider end part and a narrower root part. Thereby, in the fabrication of the protrusion region 100, the elastic member 39b can be engaged with the metal part 40b without the use of the adhesive. That is, the elastic member 39c is detachable against the metal part 40c.

Furthermore, the tire 31 can be easily mounted to the rim 32 by preliminarily removing the elastic member 39c from the metal part 40c and thereafter restoring the elastic member 39c to the metal part 40c. For this reason, a radius of the bead wire 42 is smaller than a radius of the flange part 37, and the protrusion part 100 is bulged or protrudes toward the inside space defined between a pair of the opposing flange parts 37. Therefore, it is necessary to extend the bead wire 42 when the tire 31 is mounted to the rim 32. While in case that the elastic member 39c is disengaged from the metal part 40c, the radius of the flange part 37 substantially becomes small. As a result, the tire 31 can be easily mounted to the rim 32.

Furthermore, in this modified version III, by forming the narrower opening part of the groove 40ca, it is possible to improve the durability against not only the force in the direction parallel to the axle direction but also against the force in the radially outward direction, in comparison with the first embodiment.

[Embodiment 2]

Figure 7:
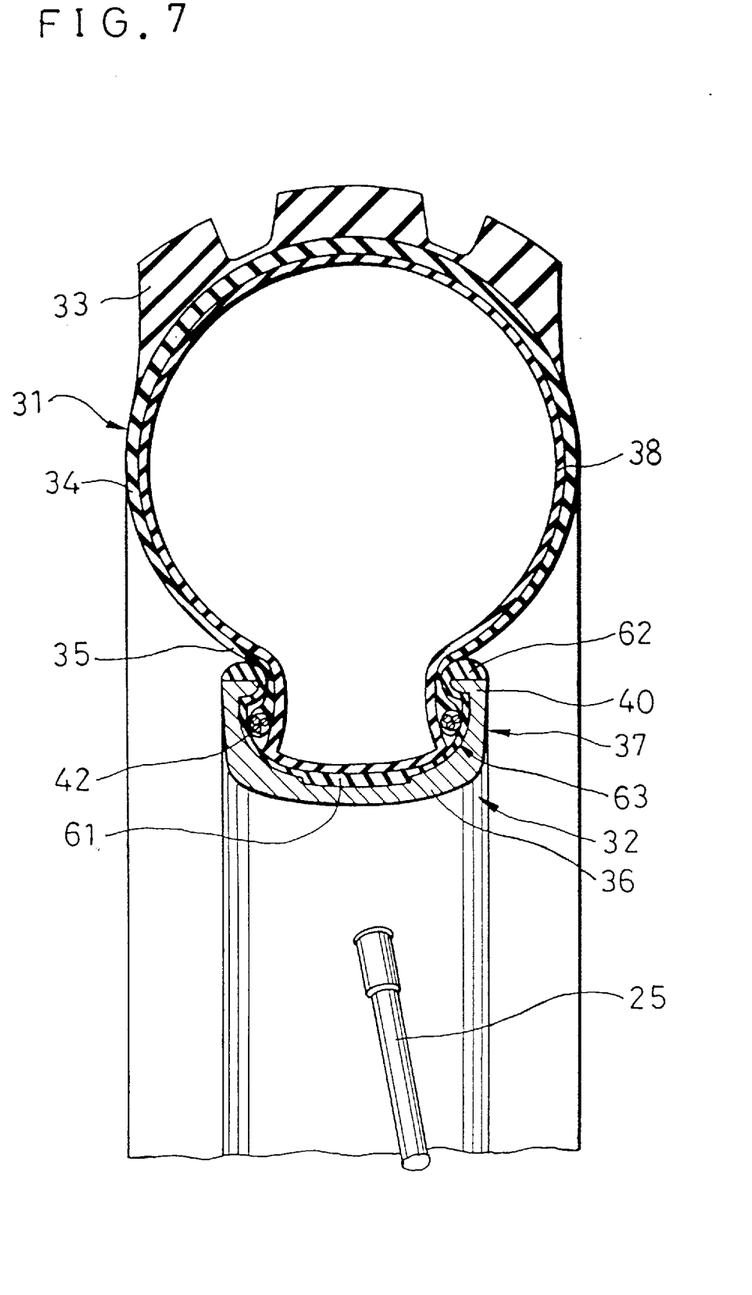
FIG. 7 is a sectional view showing a vehicle tire wheel of a second embodiment of the present invention.

FIG. 7 is a sectional view showing a vehicle tire wheel of a second embodiment of the present invention. In this second embodiment, the same components and parts as those of the first embodiment are designated by the same numerals, and corresponding descriptions similarly apply. Therefore, the descriptions will be made mainly on the modified parts from the first embodiment.

The gist of this second embodiment is to form a protector 63 integrally with the elastic member 39 of FIG. 1 and the rim-flap 41 of FIG. 1. That is, as shown in FIG. 7, a protector 63, which is made of the rubber such as the vulcanized rubber, comprises a rim-flap part 61 and an elastic member part 62. The protector 63 is mounted on the inner surface of the rim 32 so that the protector 63 is disposed between the bead part 35, the inner tube 38 and the rim 32. The protector 63 may be made also of rubber or a resin having a property of a thermoplastics.

<A MODIFIED VERSION OF THE SECOND EMBODIMENT>

Figure 8:
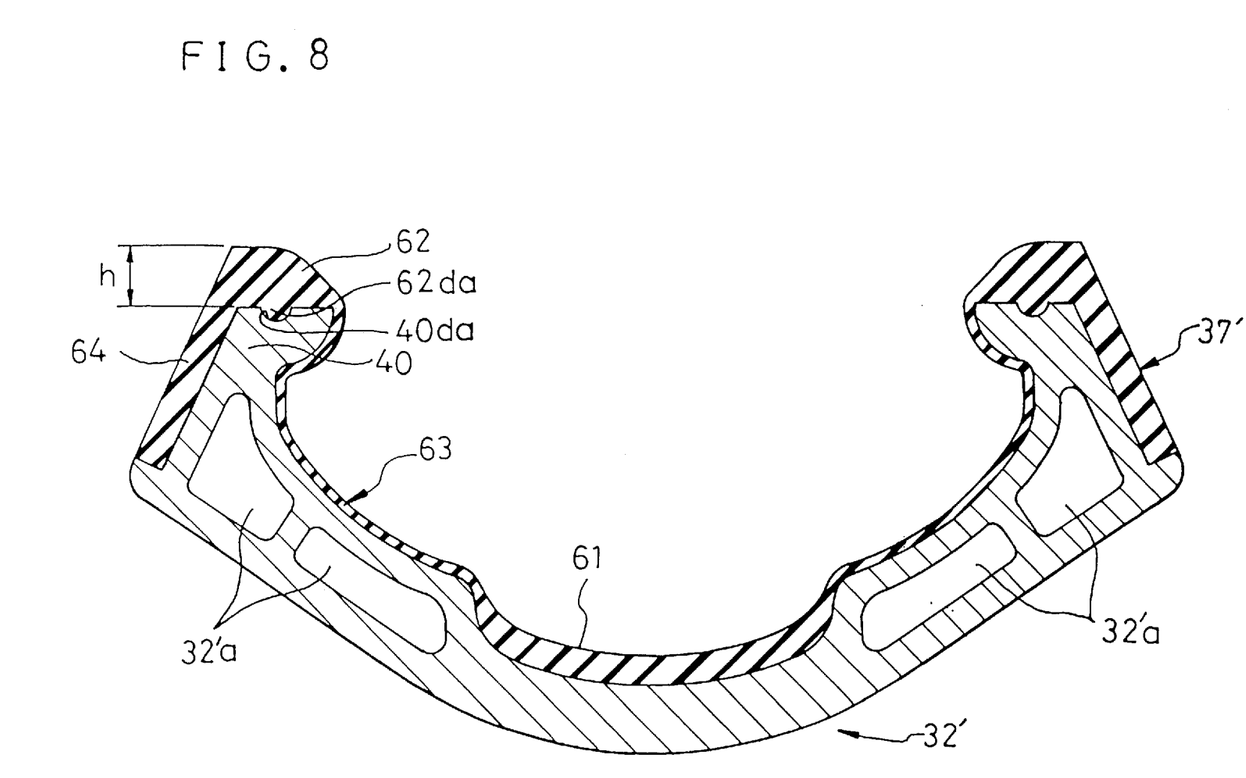
FIG. 8 is a sectional view showing a rim 32' of a modified version of the second embodiment of the present invention.

A modified version of the second embodiment will be elucidated with reference to FIG. 8, which is a sectional view showing a rim 32' of modified version of the second embodiment of the present invention. In this modified version, the same components and parts as those of the second embodiment are designated by the same numerals, and corresponding descriptions similarly apply. Therefore, the descriptions will be made mainly on the modified parts from the second embodiment.

In this modified version, a rim 32' is used in an ATB (All Terrain Bicycle or so called mountain bicycle), and has plural (for example four) gaps 32'a for weight reduction. As shown in FIG. 8, right and left side extension parts 64 are made on right and left ends of the protector 63 extending from right and left side elastic member parts 62 along the outer surfaces of the right and left side flange parts 37', respectively. Thereby, the protector 63 can be mounted on the rim 32' without the adhesive. Furthermore, it is possible to decrease weight of the rim 32'.

In this modified version, a height "h" of the elastic member part 62 shown in FIG. 8 is set in a range, for example, from 1 mm to 2 mm in accordance with the design of the ATB.

Furthermore, a groove 40da is formed on the metal part 40 in a circumferential direction of the rim 32', and an interfit part 62da is formed on the elastic member part 62 so as to fit into the groove 40da. Thereby, the protector 63 is easily mounted on the rim 32'.

[Embodiment 3]

Figure 9:
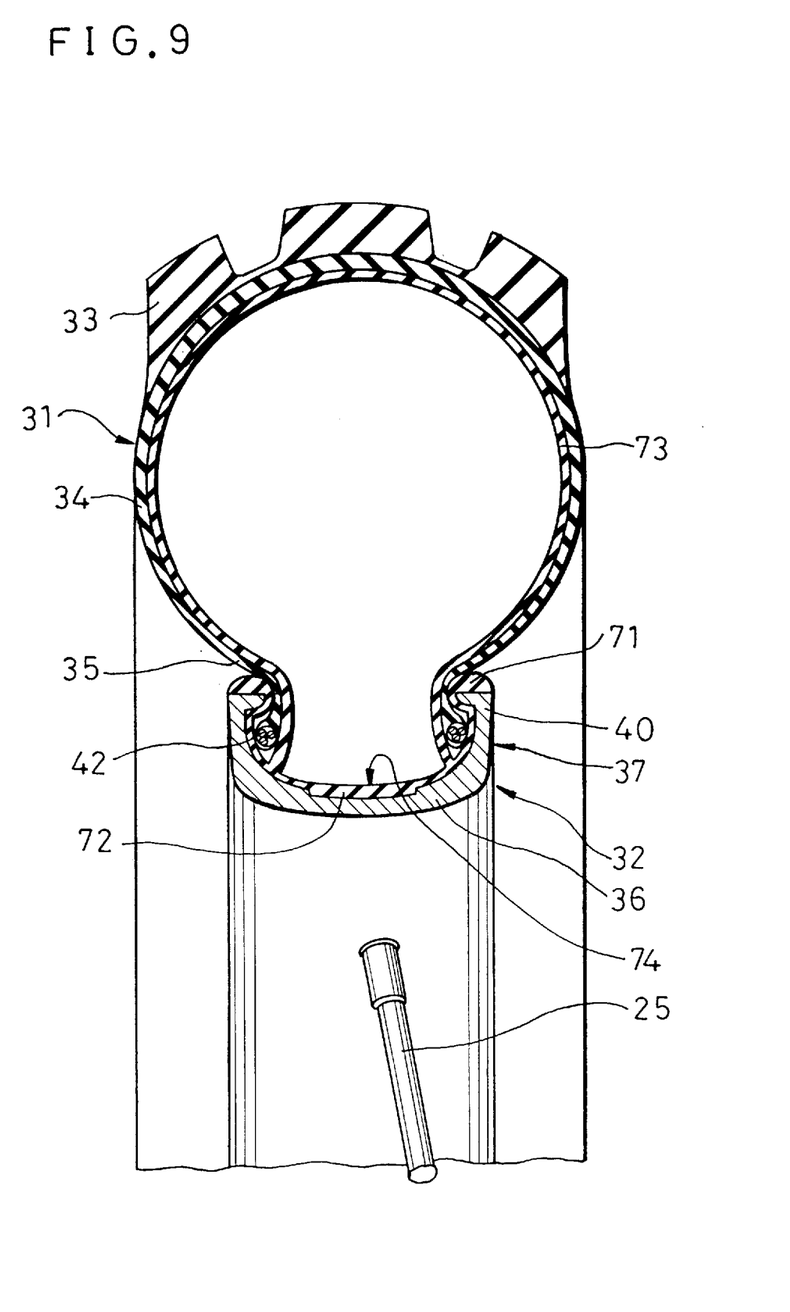
FIG. 9 is a sectional view showing a vehicle tire wheel of a third embodiment of the present invention.

FIG. 9 is a sectional view showing a vehicle tire wheel of a third embodiment of the present invention. In this third embodiment, the same components and parts as those of the second embodiment are designated by the same numerals, and corresponding descriptions similarly apply. Therefore, the descriptions will be made mainly on the modified parts from the second embodiment.

The gist of this third embodiment is to form a protector 74 integrally with the protector 63 of FIG. 7 and the inner tube 38 of FIG. 7. That is, as shown in FIG. 9, the protector 74, which is made of rubber such as vulcanized rubber, comprises an elastic member part 71, a rim-flap part 72 and a tube part 73.

[Embodiment 4]

Figure 10:
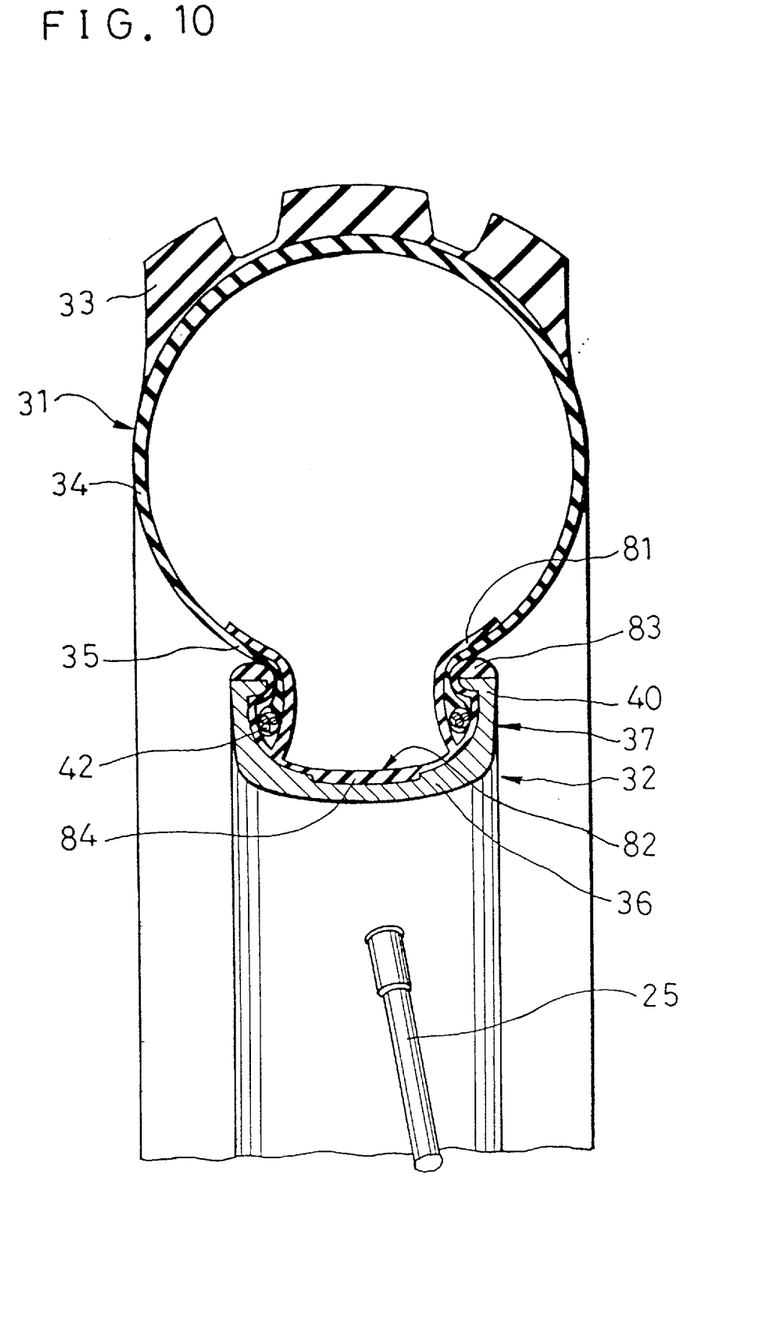
FIG. 10 is a sectional view showing a vehicle tire wheel of a fourth embodiment of the present invention.

FIG. 10 is a sectional view showing a vehicle tire wheel of a fourth embodiment of the present invention. In this fourth embodiment, the same components and parts as those of the third embodiment are designated by the same numerals, and corresponding descriptions similarly apply. Therefore, the descriptions will be made mainly on the modified parts from the third embodiment.

In this fourth embodiment, a protector 82 is made by replacing the tube part 73 (FIG. 9) with right and left side sealed parts 81. That is, as shown in FIG. 10, the protector 82, which is made of the rubber such as vulcanized rubber, comprises right and left side sealed parts 81, an elastic member part 83 and a rim-flap part 84. Thus, this fourth embodiment is a modification of the third embodiment into tubeless type one by using the right and left side sealed parts 81. Accordingly, the right and left side sealed parts 81 are fixed to the inner surfaces of the right and left side bead parts 35 by the adhesive.

[Embodiment 5]

Figure 11:
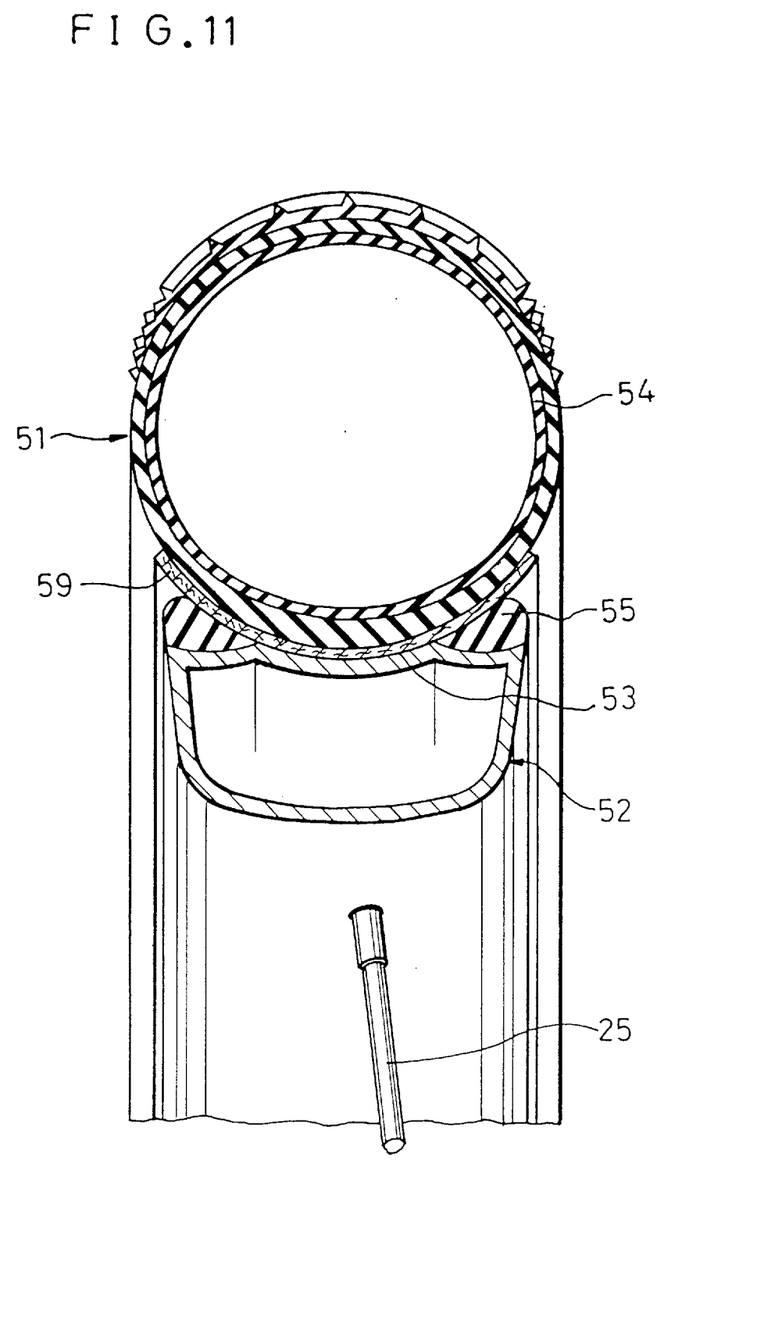
FIG. 11 is a sectional view showing a vehicle tire wheel of a fifth embodiment of the present invention.

FIG. 11 is a sectional view showing a vehicle tire wheel of a fifth embodiment of the present invention.

In FIG. 11, a vehicle tire wheel 50 comprises a tire 51 containing a inner tube 54, and a rim 52 called "tubular type". It is known that the tubular type rim 52 is used in a bicycle for racing and in a wheelchair. The tire 51 is made of rubber such as vulcanized rubber, and the sectional shape of the tire 51 has a circular shape. The tire 51 is mounted to a supporting face 53 of the rim 52, which is made of metal such as the aluminum alloy, by bonding a fabric a supporting member 59 of the tire 51 to the supporting face 53, apart from the prior art where the supporting face is the outer surface of the supporting member.

The improvement in the fifth embodiment is that right and left side elastic members 55 are provided at both ends of the supporting face 53. The side elastic members 55 reduce the occurrence of the pinch puncture.

Apart from the aforementioned explanation, wherein the sectional shape of the tire 51 has a circular shape, an alternative construction may be such that the sectional shape of the tire 51 has an oval shape.

Furthermore, apart from the aforementioned explanation, wherein the right and left side elastic members 55 are provided at both ends of the supporting face 53, an alternative construction may be such that the elastic member is disposed in the whole region between the supporting face 53 and the tire 51.

Although the present invention has been described in terms of the presently preferred embodiment, it is to be understood that such disclosure is not to be interpreted as limiting. Various alternations and modifications will no doubt become apparent to those skilled in the art after having read the above disclosure. Accordingly, it is intended that the appended claims be interpreted as covering all alternations and modifications as fall within the true spirit and scope of the invention.

What is claimed is:

1. A vehicle tire and rim combination comprising:

a tire having tread part for contacting a road when in an operative position, a pair of side walls connecting with both side ends of said tread part and a pair of beads connected to said pair of side walls, and a rim for mounting said tire thereon by inserting a portion of said tire therein, said rim having a rim base part having opposing ends and a pair of opposing flange parts each having end parts, said flange parts being disposed symmetrically with respect to said rim base part extending from both ends of said rim base part in a radially outward direction, said flange parts having protrusion regions extending along outer peripheral edges thereof, said protrusion regions including an elastic member having a generally semicircular cross-sectional shape attached to a metal part at the end parts of said flange parts, said respective protrusion regions bulging toward an inside space defined between a pair of opposing flange parts so as to embrace said beads therebetween with the elastic members contacting the tire.

2. A vehicle tire and rim combination in accordance with claim 1, wherein grooves are formed in a circumferential direction on said metal parts, and interfit parts are formed on said elastic members so as to fit said grooves.

3. A vehicle tire and rim combination in accordance with claim 2, wherein said elastic members are detachably engaged with said metal part.

4. A vehicle tire and rim combination in accordance with claim 1, wherein said tire includes an inner tube and said elastic members are formed integrally with a rim flap thereby defining a protector for protecting said inner tube.

5. A vehicle tire and rim combination in accordance with claim 4, wherein, said protector is integrally formed with said inner tube.

6. A vehicle tire and rim combination in accordance with claim 4, wherein sealed parts are formed continuous on said protector and on the inner surfaces of said tire.

* * * * *